United States Patent [19]

Lombardi et al.

[11] Patent Number: 4,641,730
[45] Date of Patent: Feb. 10, 1987

[54] ASSEMBLY COMPONENT FOR A DISC BRAKE

[75] Inventors: Michel Lombardi, Villepinte; Jean-Louis Gerard, Paris, both of France

[73] Assignee: Societe Anonyme D.B.A., Paris, France

[21] Appl. No.: 734,631

[22] Filed: May 15, 1985

[30] Foreign Application Priority Data

May 23, 1984 [FR] France .................... 84 08053

[51] Int. Cl.⁴ .................................. F16D 65/02
[52] U.S. Cl. ........................... 188/73.45; 188/73.39
[58] Field of Search ............... 188/73.45, 73.39, 73.43, 188/73.44, 73.46, 73.47, 71.1

[56] References Cited

U.S. PATENT DOCUMENTS 4,046,231  9/1977  Ohori et al. ............ 188/73.39 X

FOREIGN PATENT DOCUMENTS 2707058  8/1977  Fed. Rep. of Germany ... 188/73.45
2738582  3/1978  Fed. Rep. of Germany ... 188/73.45
0044121  3/1980  Japan ........................ 188/73.45
949694  10/1962  United Kingdom ............ 188/73.47

Primary Examiner—Duane A. Reger
Assistant Examiner—Lawrence J. Goffney, Jr.
Attorney, Agent, or Firm—Larry J. Palguta; Ken C. Decker

[57] ABSTRACT

Assembly component (56) for a disc brake of the type incorporating a calliper (10) sliding on a fixed support (16) by way of two axial pillars (12, 14) each incorporating, firstly, a cylindrical sleeve (42), and secondly, a removable portion (40) one end of which (48) incorporates a thread which is capable of fixing the pillar (12, 14) to the fixed support (16), and whose other end (52) is capable of being pushed in rotation by a suitable mounting tool. The assembly component (56) forms a channel with parallel sides, one side of which incorporates locking portions cooperating with each of the sleeves (42) and firmly fixing the assembly component (56) to the sleeves (42), whose other side carries tapped components (50) capable of cooperating with the removable portion (40), and whose central portion (76) straddles the fixed support (16).

10 Claims, 8 Drawing Figures

ASSEMBLY COMPONENT FOR A DISC BRAKE

The invention concerns an assembly component for a disc brake for a motor vehicle.

The invention concerns more particularly an assembly component for a disc brake of the type incorporating a calliper sliding on a fixed support by means of two axial pillars each incorporating, firstly, a cylindrical sleeve, and secondly, a removable portion, one end of which incorporates a thread which is capable of fixing the pillar to the fixed support, and whose other end is capable of being pushed in rotation by a suitable mounting tool.

In a brake of this type in which the pillars necessarily have little clearance relative to the bores in which they are housed, the tightening of the removable components can cause rotation of the sleeves and as the latter are not perfectly centered on the removable portions, the sleeves can act in the manner of eccentrics and can jam the sliding of the sliding system. Normal operation of the brake is then impossible, and only the friction component which is pushed directly by the brake actuator can be applied to the disc, the friction component capable of being applied by reaction is not put into contact with the disc. This results firstly in asymmetrical wear of the two friction components, and in the long term can cause fracture of the disc, the latter being pushed on one side only. In addition, in this type of brake it is necessary to tap holes formed in the fixed support to permit mounting of the threaded end of the removable portion; this tapping operation needs to be accurate, in particular its perpendicularity to the surface of the fixed support is very important, so as to ensure the perpendicularity of the sleeve relative to the fixed support, and thus to ensure that the two sleeves, which ensure satisfactory sliding of the brake on its pillars, are parallel.

The subject of the invention is an assembly component for a brake of the type described above, in which rotation of the sleeves is avoided, the precautions of the tapping operation are also avoided and the tapping of the fixed support is eliminated, and thus the assembly component enables the disadvantages mentioned above to be avoided.

With this aim, the invention proposes an assembly component for a disc brake of the type incorporating a calliper sliding on a fixed support by means of two axial pillars each incorporating, firstly, a cylindrical sleeve, and secondly, a removable portion, one end of which incorporates a thread, capable of fixing the pillar to the fixed support, and whose other end is capable of being pushed in rotation by a suitable mounting tool, the assembly component being characterized in that it forms a channel with parallel sides, one side of which incorporates locking portions cooperating with each of the sleeves and firmly fixing the said assembly component to the sleeves, whose other side carries tapped components which are capable of cooperating with the removable portion, and whose central portion of the channel straddles the fixed support.

It is thus apparent that owing to the invention, the assembly component, which is firmly fixed to the sleeves, prevents the latter from turning, and permits the mounting of the removable portions, since the assembly component straddles the fixed support and carries tapped components.

Another aim of the invention is to make the assembly component become firmly fixed to the brake, so that the brake must be mounted with the assembly component, without requiring accurate tapping of the fixed support.

A description follows, by way of an example which is not limiting, of a preferred embodiment of the invention, referring to the accompanying drawings, in which.

Figure 1:
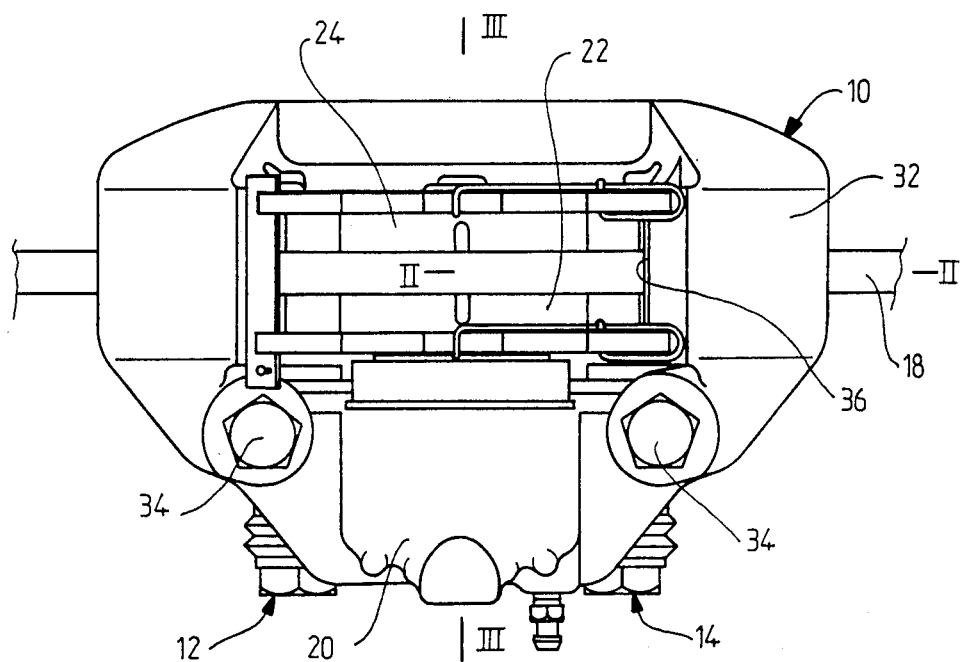
FIG. 1 is a plan view of a disc brake constructed in accordance with the invention.
Figure 2:
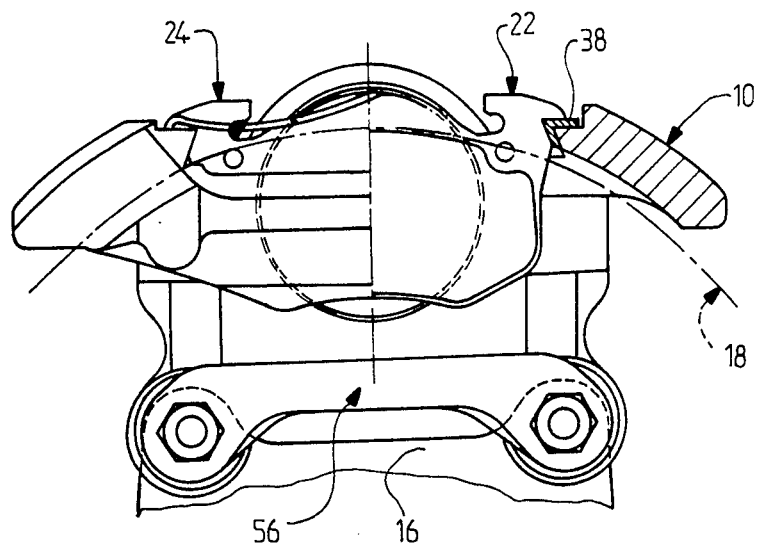
FIG. 2 is a front view in partial section of the brake shown in FIG. 1.

FIGS. 1-5 show a disc brake incorporating a movable system forming a sliding calliper, given the general reference 10, mounted so as to slide on two pillars 12 and 14 on the fixed support 16 situated in the region of the disc 18. The calliper 10 incorporates actuating means 20 which are capable of pushing directly a first friction component 22, and by reaction a second friction component 24, against the opposite faces of the disc 18. In the embodiment shown, the actuating means 20 consist of a hydraulic actuator incorporating a piston 26 mounted so as to slide in a blind bore 28, so as to define with the latter a chamber of variable volume 30 intended to be joined to a source of fluid under pressure such as, for example, the master cylinder of the vehicle (not shown). The actuating means 20 are associated in a manner such that they may or may not be removable, with a frame in the shape of a "C" 32, by screws 34, for example. The frame 32 incorporates an opening 36, whose circumferentially spaced edges house the friction components 22 and 24, for them to slide and to be anchored. The circumferentially spaced edges of the opening 36 are in the shape of a V, one V being formed by a removable key 38, which after being extracted axially allows the friction components 22 and 24 to be extracted radially.

The pillars 12 and 14 each consist of a screw 40 forming a removable portion carrying a sleeve 42 whose outside surface 44 co-operates with a bore 46 formed in the portion of the calliper 10 carrying the actuating means 20. Each of the screws 40 is threaded at one end 48, this end 48 co-operating with a tapped component 50. Each of the screws 40 incorporates at its other end 52 a hexagonal head capable of being pushed in rotation by a suitable mounting tool enabling the screws 40 to be fixed into the tapped components 50. The sleeves 44 are inserted between the heads of the ends 52 of the screws 40 and the fixed support 16. Sealing components 54 are associated with the calliper 10 to provide protection and lubrication of the surfaces of the bore 46 and of the sleeve 42 which are in contact, and to prevent the entry of contaminants.

In accordance with the invention, the brake incorporates an assembly component, designated as a system by the reference 56. Referring to FIGS. 3-7 it will be seen that the assembly component 56 has the shape of a channel with parallel sides which straddle the fixed support 16. More precisely, the assembly component incorporates one side 58 in which two forks 60 and 62 are formed at each of the ends 64 and 66 of the channel, the forks 60 and 62 forming locking portions. The other side 68 of the channel carries two nuts 70 and 72 crimped into openings 74 formed in the side 68. These nuts 70 and 72 form the tapped components 50. The two sides 58 and 68 of the assembly component 56 are joined by a central portion 76 which is essentially perpendicular to each of the sides 58 and 68 thus forming a channel with parallel sides.

Figure 3:
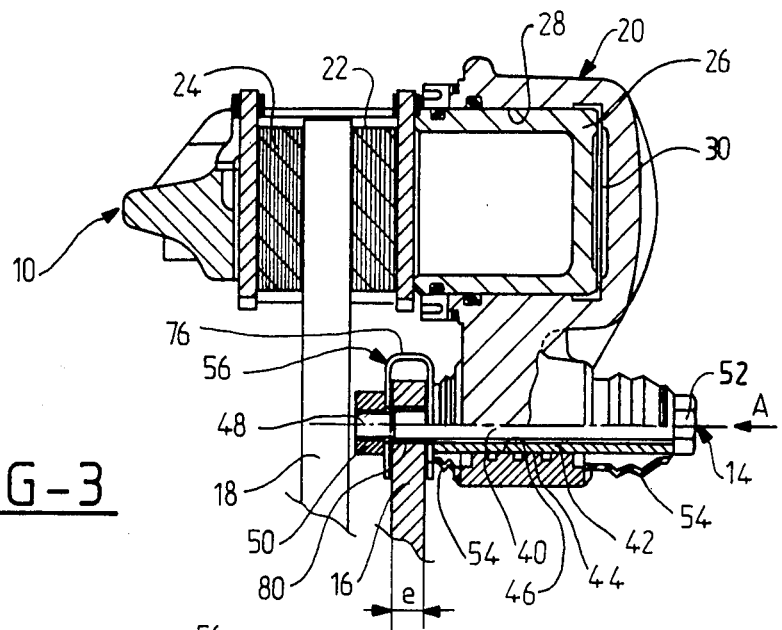
FIG. 3 is a view sectioned through the line III—III shown in FIG. 1.
Figure 4:
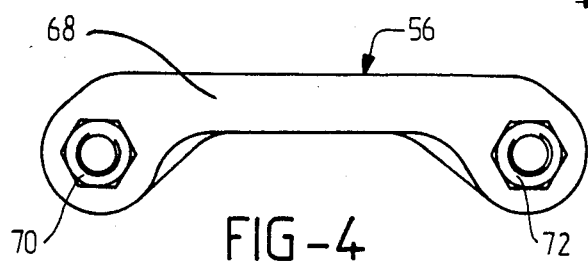
FIG. 4 is a front view of the assembly component, the subject of the invention.
Figure 7:
FIG. 7 is a view sectioned through the line VII—VII shown in FIG. 5.
Figure 5:
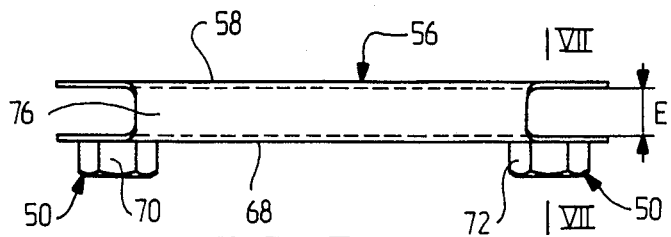
FIG. 5 is a plan view of the assembly component shown in FIG. 4.
Figure 8:
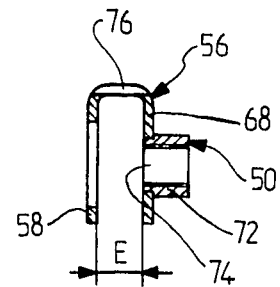
FIG. 8 is a sectional view of a pillar sleeve in line with the locking portions of the assembly component.
Figure 6:
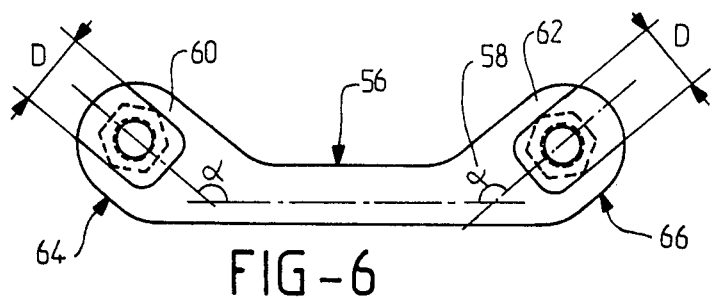
FIG. 6 is a rear view of the assembly component shown in FIG. 4.

Referring to FIG. 6, it will be seen that the two forks 60 and 62 are inclined at an angle α relative to the longitudinal axis of the channel. It will also be seen that the two sides of each fork are parallel and separated by a distance D. Referring to FIG. 8, which shows in section each of the sleeves 42 in line with the forks 64 and 66, these sleeves have a least one transverse slot 76, with a flat bottom 78, whose axial width is slightly greater than the thickness of the side 58 of the channel. If the sleeve 42 has only one single slot 76, the bottom of the latter defines with the outside surface of the sleeve a distance d1 which is slightly less than the distance D of the two sides of the forks 60 and 62, in the same way, if the sleeve 42 has two slots 76, the distance d2 between the bottoms of these slots will also be slightly smaller than the distance D of the sides of each of the forks. This allows the forks 60 and 62 to be engaged on the sleeves 42, according to the embodiment selected. Referring to FIGS. 3, 5 and 7 it will be seen that the two parallel sides 58 and 68 of the channel are spaced internally by a distance E, the thickness of the fixed support being e, as shown in FIG. 3. E is defined in such a way that when the forks 60 and 62 are engaged in the slots 76, the fixed support 16 of thickness e is able to engage between the sides 58, 68 of the channel and the end of the sleeve 42 adjacent to the slot 76.

It should be noted that the fixed support 16 has smooth holes 80 in the positions required for the brake to be mounted, the diameter of these holes 80 being slightly greater than the outside diameter of the screws 40.

The mounting operation of the brake shown in FIGS. 1-8 is carried out in the following manner. The calliper 10 is first equipped with the actuating means 20 and with the friction components 22 and 24, together with the sealing components 54. Each of the sleeves 42 is then positioned facing the corresponding fork 60 or 62 opening outwards from the channel. By engaging the slots 76 between the two sides of the fork, the sleeve 42 are immobilized in rotation owing to the co-operation between the sides of the forks and the bottoms of the slots 78. Mounting of this sub-system of the assembly component 56 and two sleeves 42 is then carried out, into the bores 46 formed in the calliper 10, takeing care to mount the sealing components 54 correctly on these sleeves. When the assembly component and the two sleeves 42 occupy a position relative to the calliper 10 as shown in FIG. 3, care is taken to mount correctly the other two sealing components 54 which are situated on the side remote from the disc 18.

Mounting of the calliper system on the fixed support 16 may now be carried out. For this purpose, the two sides 58 and 68 of the assembly component 56 are engaged on each side of the fixed support 16, in such a way that the nuts 70 and 72 are situated facing the holes 80 formed in the fixed support 16. The screws 40 are then mounted, by positioning them according to the arrow A shown in FIG. 3. The screws 40 first pass through the central hole in the sleeves 42, then enter the holes 80 of the fixed support 16, and may then be screwed into the nuts 70 and 72 by means of the hexagonal head of the end 52 of the screws 40, by using a suitable tool (not shown).

It will be seen, from the above description, that owing to the forks 60 and 62 rotation of the sleeves 42 is prevented, which avoids any eccentric effect during tightening of the screws 40, and in addition the fixed support 16 simply has smooth holes 80 for each of the screws 40, clamping of the sleeves 42 between the heads of the ends 52 of the screws 40 and the fixed support 16 taking place owing to the nuts 70 and 72 carried by the side 68 of the assembly component 56. It is not necessary to have accurate perpendicularity between the tapping of the nuts 70 and 72 and the surface of the fixed support 16 as the channel is made of folded sheet metal, and this allows the nuts to be positioned correctly relative to the screws 40 without forcing the latter.

It should also be noted that, as the forks 60 and 62 open in generally opposite directions, they ensure that the assembly component 56 is firmly fixed to the calliper 10 through the sleeves 42, the only way of removing the assembly component being after withdrawal of the sleeves 42 from the bores 46 of the calliper 10. An assembly component is thus obtained which is mountable or removable as a unit with the calliper when the screws or removable portions 40 are withdrawn. This arrangement avoids any error or omission during mounting.

In the embodiment shown, the assembly component 56 is made from sheet metal folded into a channel; it is clear that modifications can be carried out to the construction of this channel, and also for example to the inclination of the forks relative to the axis of the channel without departing from the framework of the present invention.

We claim:

1. An assembly component for a disc brake of the type including a caliper sliding on a fixed support by means of two axial pillars each including a cylindrical sleeve and a removable portion, one pillar end of each pillar including a thread for fixing the pillar to the fixed support and the other pillar end rotatable by a suitable mounting tool, characterized in that the assembly component comprises a channel with parallel component sides, one component side including locking portions cooperating with the sleeves and fixing firmly the assembly component to the sleeves and the other component side carrying tapped components cooperating with the removable portion, and a central component portion straddling the fixed support.

2. The assembly component according to claim 1, characterized in that each locking portion is formed by a fork cooperating by at least one fork side with, and positioned facing, a transverse slot having a flat bottom formed on an outside surface of the corresponding sleeve.

3. The assembly component according to claim 2, characterized in that a distance, allowing for mounting clearance, between two fork sides on each of the forks corresponds to a distance between the bottom of the slot and a nearest diametrically opposed outside surface of the sleeve.

4. The assembly component according to claim 2, characterized in that each sleeve includes two transverse slots with flat bottoms parallel to each other, and in that a distance, allowing for mounting clearance, between two fork sides of each of the forks corresponds to a distance between the two flat bottoms of a slot.

5. The assembly component according to claim 3, characterized in that each of the forks is positioned in a region of each channel end and in that the forks are open in the region of each of the channel ends.

6. The assembly component according to claim 5, characterized in that each of the forks is inclined relative to a longitudinal axis of the channel.

7. The assembly component according to claim 1, characterized in that the other component side of the channel includes two nuts forming the tapped components fixed to the other component side, facing openings formed in the other component side, the openings allowing the removable portions to pass through.

8. The assembly component according to claim 7, characterized in that the nuts are crimped into the openings.

9. The assembly component according to claim 2, characterized in that a distance which separates inside flanks of the parallel sides of the channel is equal to at least a thickness of the fixed support.

10. The assembly component according to claim 9, characterized in that component forms with the caliper a system mountable or removable as a unit when the removable portions are absent.

* * * * *